Aug. 14, 1928.  1,680,371
E. E. EINFELDT
LOCKING DEVICE FOR WHEEL RIM EXPANDING WEDGES
Filed Dec. 24, 1926    2 Sheets-Sheet 1

INVENTOR
E. E. Einfeldt
BY
Rogers, Kennedy Campbell
ATTORNEYS.

Aug. 14, 1928.　　　　　　　　　　　　　　　　　　　1,680,371
E. E. EINFELDT
LOCKING DEVICE FOR WHEEL RIM EXPANDING WEDGES
Filed Dec. 24, 1926　　　　　2 Sheets-Sheet 2

INVENTOR
E. E. Einfeldt
BY
Rogers, Kennedy Campbell
ATTORNEYS.

Patented Aug. 14, 1928.

1,680,371

UNITED STATES PATENT OFFICE.

ERNEST E. EINFELDT, OF DAVENPORT, IOWA, ASSIGNOR, BY MESNE ASSIGNMENTS, TO FRENCH & HECHT, INC., OF DAVENPORT, IOWA, A CORPORATION OF IOWA.

LOCKING DEVICE FOR WHEEL-RIM-EXPANDING WEDGES.

Application filed December 24, 1926. Serial No. 156,772.

This invention relates to means for securing tires to wheel rims, and has reference more particularly to that type of tire mounting in which a split or open rim is expanded by means of a wedge seated between the ends of the rim, forcibly within the tire ring and the parts thus firmly connected together in operative relation.

The aim of the present invention is to prevent the wedge, after it has been driven home or seated, from loosening or backing out, and the invention consists of a locking device carried by the wedge and cooperating with the rim end or ends in such manner as to resist or oppose the tendency of the wedge to back out from its seat. In the specification to follow the improved locking device will be described in detail, and the novel features thereof will be pointed out in the appended claims.

Figures 1, 2:
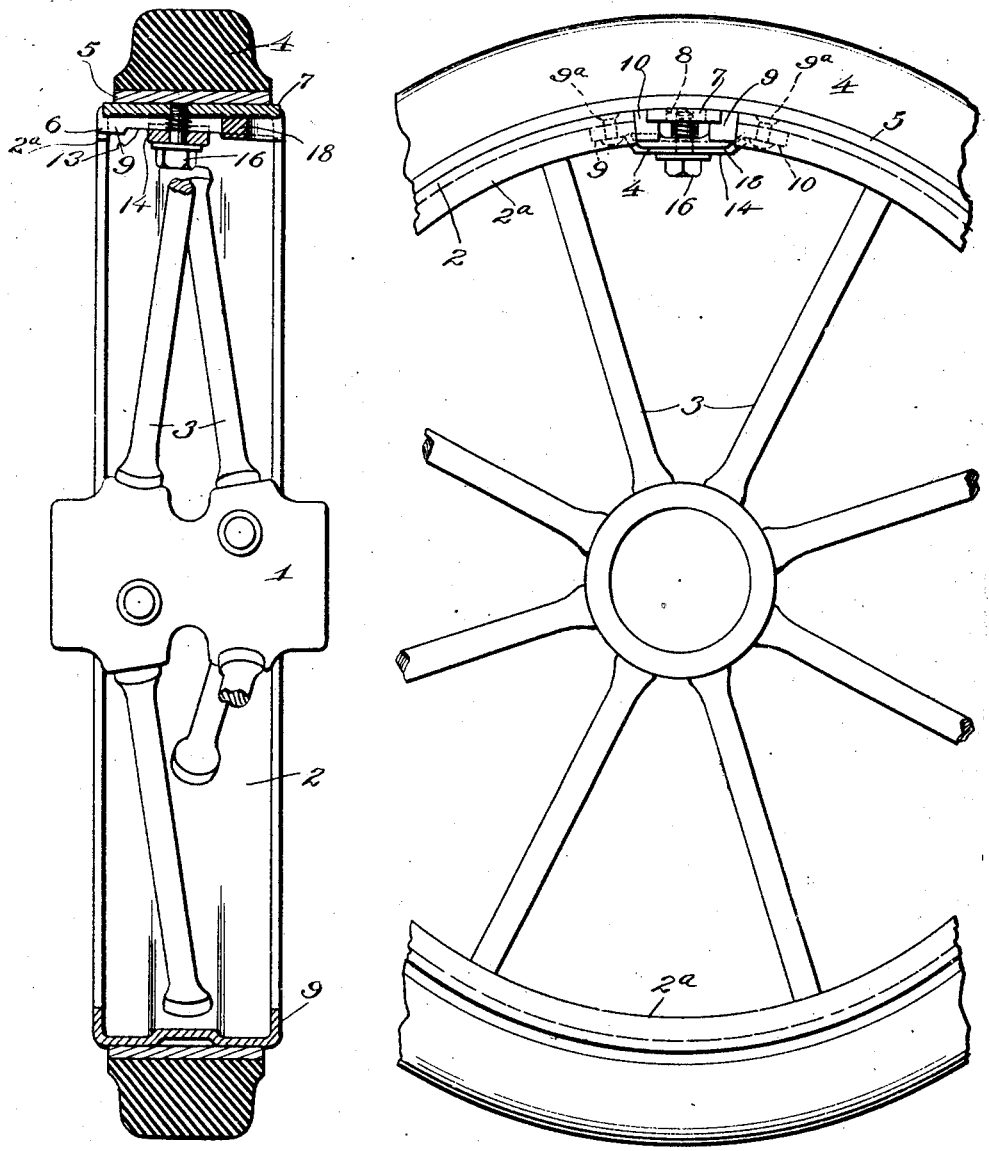
Fig. 1 is a side elevation of a wheel and attached tire, the same having my invention applied thereto.
Fig. 2 is a view showing the rim and tire in axial section, and the spokes and hub in elevation.

Referring to the drawings:

The wheel shown by way of example in illustrating the invention, comprises a hub 1, rim 2, and spokes 3 connected at their ends respectively with the hub and rim, the said rim being encircled by a rubber tire 4 attached as usual to a steel tire base or ring 5.

The rim 3 is split or open as at 6, and is expanded so as to fit tightly within the tire ring and maintained in expanded condition by an expanding wedge 7, seated between wedging surfaces 8 on the respective ends of the rim.

In the present instance, the rim is formed with inturned edge flanges 2ª thereby forming a channeled rim, and the wedging surfaces 8 are formed on castings 9 and 10 which are firmly fastened to the ends of the rim between the flanges by suitable means, in the present instance by rivets 9ª, the said castings thus forming in effect the ends of the rim. These castings are thickened at their adjacent edges and each is formed in its thickened portion with a recess 11. The outer walls of these recesses, which constitute the said wedging surfaces 8, slope inwardly toward each other in a direction axially of the wheel, so as to cooperate with the sloping edges of the wedge, and the bottoms 12 of the recesses form seating or supporting surfaces for the inner sides of the wedge, the outer face of which, when seated in place, will be flush with the outer face of the rim. The inner faces 13 of the thickened portions of the castings, slope or incline in a direction axially of the wheel, the arrangement being such that the highest parts of the faces 13 will be at the point of greatest spacing of the wedging surfaces 8, in other words the taper or slope of the faces 13 increases in the direction of the backing out movement of the wedge. Cooperating with these sloping faces 13, is a wedge clamping or locking device in the form of a plate 14 provided with a hole 15 through which loosely passes a bolt 16 screwed at its end into a hole 17 in the wedge, the said locking plate, when the bolt is screwed up as shown in Figs. 1 and 3, bearing on the sloping faces 13 and acting to lock the wedge in position, any tendency of the wedge to become loose by backing out being resisted and opposed by the surfaces 13, which, increasing in height in the direction of the backing out movement as before described, will cause the locking plate to bind thereon.

In assembling the parts, the tire is slipped over the rim, and the wedge inserted between the wedging surfaces 8, and driven home so as to expand the split rim tightly within the tire ring. The locking plate is then seated on the sloping faces 13, and the bolt is passed through the hole in the plate and screwed into the hole in the wedge, and on the bolt being tightened up, the locking plate will be drawn down and clamped tightly against the faces 13, thereby holding the wedge in its seated position and effectually preventing the same from backing out and releasing the rim ends. With the parts in this position, any endwise movement of the wedge tending to loosen the same, will act, by reason of the wedging action of the locking plate on the sloping surfaces 13, to more firmly clamp the parts together, so that the wedge will be effectually prevented from becoming displaced or loosened.

Figure 3:
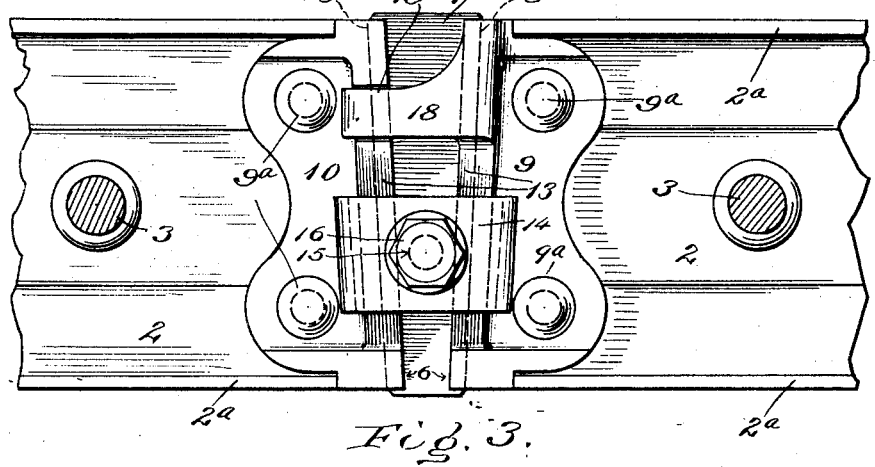
Fig. 3 is an inside view, on an enlarged scale, of the rim ends with the expanding wedge in place and the wedge locking device applied.
Figure 4:
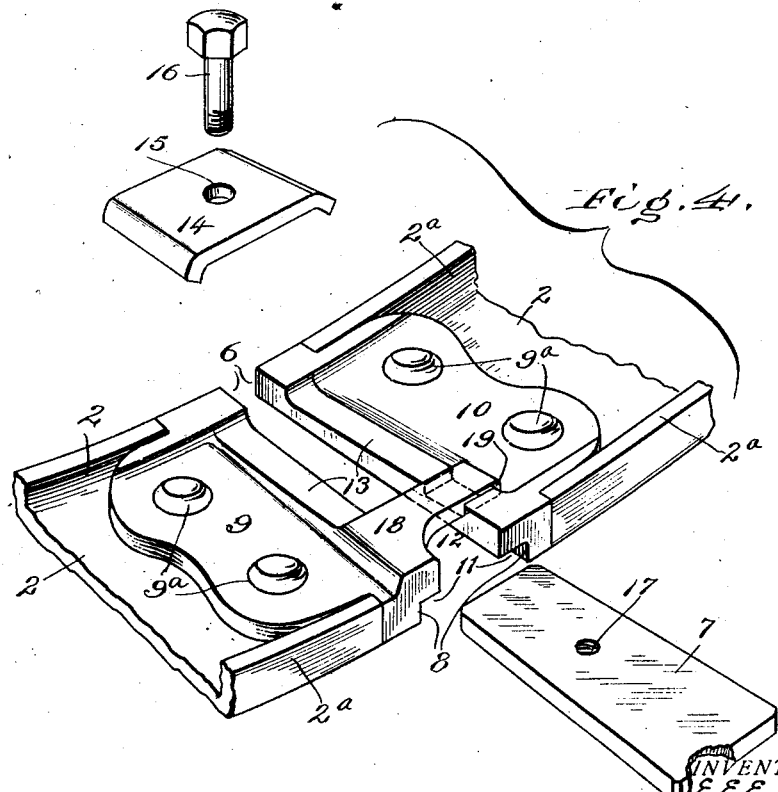
Fig. 4 is a perspective view of the same with the wedge and wedge locking device separated from the rim ends.

In order to line up the ends of the rim and prevent one end from shifting laterally relatively to the other, one of the castings, the casting 9 in the present instance, is provided with an aligning finger 18 which is adapted to enter an open recess 19 in the thickened edge of the other casting, as best shown in Figs. 3 and 4.

While in the accompanying drawings the invention is shown as applied to a rim of channeled form, which, by reason of such form has fixed to its ends special castings to enable the wedge to cooperate therewith, it will be understood that the invention is applicable as well to rims of flat unchanneled form, whose ends could be properly shaped to enable the expanding wedge to cooperate with them, and to be locked in position, in a manner as hereinbefore described.

While in the foregoing description and accompanying drawings I have set forth my invention in the particular detailed form which I prefer to adopt, it will be manifest that these details may be variously changed without departing from the spirit of the invention; and it will be understood that the invention is not limited to any particular form or construction of the parts, except in so far as such limitations are specified in the claims.

Having thus described my invention, what I claim is:

1. In combination with a split wheel rim having on its ends wedging surfaces and adapted to be expanded to seat within a tire ring, said rim being provided with sloping faces, an expanding wedge seated between said wedging surfaces, and a wedge locking device attached to the wedge and adapted to bear on said sloping faces and thereby resist the backing out movement of the wedge.

2. In combination with a split wheel rim having on its ends wedging surfaces and adapted to be expanded to seat within a tire ring, said rim ends being provided with sloping faces whose highest parts are at the point of greatest spacing of the wedging surfaces, an expanding wedge seated between said wedging surfaces, and a wedge locking device attached to the wedge and adapted to cooperate with said sloping faces in opposing the backing out movement of the wedge.

3. In combination with a split wheel rim provided on its ends with wedging surfaces and adapted to be expanded within a surrounding tire ring, said rim being provided also with sloping faces, a wedge seated between said wedging surfaces, a wedge locking plate attached to the wedge and adapted to bear on said sloping faces, and means for clamping said plate against the sloping faces to hold the wedge in its set position.

4. In combination with a split channeled wheel rim adapted to be expanded within a tire ring, castings separably fixed to the ends of the rim in the channels thereof and formed in their outer sides with axially extending recesses having outer converging walls forming wedging surfaces, and having bottoms forming wedge seats, said castings being provided on their inner sides with sloping faces, a rim expanding wedge supported on said seats and extending between said wedging surfaces to cooperate therewith in expanding the rim, and a wedge locking plate attached to the wedge and bearing on said sloping faces to lock the wedge in its set position.

In testimony whereof, I have affixed my signature hereto.

ERNEST E. EINFELDT.